(12) United States Patent
Sun et al.

(10) Patent No.: US 9,180,486 B2
(45) Date of Patent: Nov. 10, 2015

(54) METHOD FOR PREPARING A POROUS ANTI-REFLECTION THIN FILM COMPOSED OF HOLLOW POLYMERIC NANOPARTICLES

(75) Inventors: Zhijuan Sun, Hangzhou (CN); Xiang Gao, Hangzhou (CN); Yingwu Luo, Hangzhou (CN)

(73) Assignee: ZHEJIANG UNIVERSITY (CN)

( * ) Notice: Subject to any disclaimer, the term of this patent is extended or adjusted under 35 U.S.C. 154(b) by 200 days.

(21) Appl. No.: 13/824,831

(22) PCT Filed: May 31, 2011

(86) PCT No.: PCT/CN2011/074976
§ 371 (c)(1),
(2), (4) Date: Mar. 18, 2013

(87) PCT Pub. No.: WO2012/055238
PCT Pub. Date: May 3, 2012

(65) Prior Publication Data
US 2013/0209678 A1 Aug. 15, 2013

(30) Foreign Application Priority Data

Oct. 29, 2010 (CN) .......................... 2010 1 0523969

(51) Int. Cl.
*B05D 3/12* (2006.01)
*B05D 5/06* (2006.01)
*G02B 1/111* (2015.01)
(Continued)

(52) U.S. Cl.
CPC ................ *B05D 5/061* (2013.01); *B01J 13/14* (2013.01); *B01J 13/203* (2013.01); *G02B 1/111* (2013.01); *G02B 5/0247* (2013.01); *B05D 1/005* (2013.01); *B82Y 20/00* (2013.01); *B82Y 30/00* (2013.01); *G02B 1/118* (2013.01)

(58) Field of Classification Search
None
See application file for complete search history.

(56) References Cited

U.S. PATENT DOCUMENTS

2006/0046045 A1 3/2006 Wang et al.
2007/0251422 A1* 11/2007 Maenaka et al. ......... 106/287.28
(Continued)

OTHER PUBLICATIONS

Sun et al., "Fabrication of non-collapsed hollow polymeric nanoparticles with shell thickness in the order of ten nanometres and anti-reflection coatings," Soft Matter, 2011, vol. 7, pp. 871-875.*
(Continued)

*Primary Examiner* — Kirsten Jolley
(74) *Attorney, Agent, or Firm* — Polsinelli PC

(57) ABSTRACT

A method for preparing a porous anti-reflective thin film composed of hollow polymer nano-particles is provided in the following steps: Firstly, an aqueous dispersion having mass percent of 3-7% is prepared using polymer nano-capsules. A thin film comprising polymer nano-capsules is formed by spin coating on one side or both sides of the substrate using a spin coater. The thin film comprising polymer nano-capsules is dried in vacuum at high temperature. After the core materials of the polymer nano-capsules evaporate completely, the polymer nano-capsules turn into hollow polymer nano-particles, and a porous anti-reflective thin film composed of hollow polymer nano-particles is prepared. The thickness and refractive index of the thin film are adjusted conveniently and effectively by changing the concentration of polymer nano-capsules aqueous dispersion and the hollow volume rate of the polymer nano-particles. The thin film has the advantages of high mechanical intensity and abrasion resistance.

6 Claims, 3 Drawing Sheets

(51) Int. Cl.
    *G02B 5/02*     (2006.01)
    *B01J 13/14*     (2006.01)
    *B01J 13/20*     (2006.01)
    *B05D 1/00*     (2006.01)
    *B82Y 20/00*     (2011.01)
    *B82Y 30/00*     (2011.01)
    *G02B 1/118*     (2015.01)

(56) References Cited

U.S. PATENT DOCUMENTS

2010/0048750 A1*    2/2010    Blom et al. .................. 521/121
2013/0046052 A1*    2/2013    Armes et al. ................. 524/547

OTHER PUBLICATIONS

CN102030483A, publication date Apr. 27, 2011, China, English translation of Abstract only, one page.
CN1938366A, publication date Mar. 28, 2007, China, English translation of Abstract only, one page.
JP2006-350025A, publication date Dec. 28, 2006, Japan, English translation of Abstract only, one page.
Renzhog, W et al., Synthesis of structured nanoparticles of styrene/butadiene block copolymers via RAFT seeded emulsion polymerization, Polymer, 2010 vol. 51, p. 3879-3886.
International Search Report regarding PCT/CN2011/074976, dated Sep. 8, 2011, 3 pages.

* cited by examiner (a)　　　　　　　　　　(b)

(a) (b)
(c) (d)

METHOD FOR PREPARING A POROUS ANTI-REFLECTION THIN FILM COMPOSED OF HOLLOW POLYMERIC NANOPARTICLES

TECHNICAL FIELD

The present invention relates to a method for preparing an anti-reflection thin film, and in particular, to a method for preparing a porous anti-reflection thin film composed of hollow polymeric nanoparticles.

BACKGROUND ART

An anti-reflection thin film is capable of enhancing the transmittance of an optical device so as to reduce unnecessary reflections and glare, which possesses an important application value and development prospect in such fields as solar cell, liquid crystal display and optical element, etc. The basic principle for anti-reflection is to achieve the purpose of anti-reflection by means of interference and counteraction of light under certain conditions (the anti-reflection mechanism is as shown in FIG. 1), wherein when the light resulting from incident light being reflected at the surface of an anti-reflection layer and the light resulting from the incident light being reflected at the interface between the anti-reflection layer and a substrate are destructed due to the reversal of their phases under certain conditions, the energy of the reflected light can thus be counteracted. For an ideal mono-layer anti-reflection thin film, it must meet the following two requirements: the optical thickness of the film, i.e., the product of the thickness of the thin film and the refractive index thereof, is one quarter of the wavelength of the incident light; the square of the refractive index ($n_1$) of the film is required to be equal to the product of the refractive index ($n_2$) of the substrate and the refractive index ($n_0$) of air, namely, $n_0 n_2 = n_1^2$. Generally, $n_0$ is 1, while commonly used substrates of quartz, glass and some transparent polymers have a refractive index in the range of from about 1.45 to 1.53, and so $n_1$ is required to be in the range of from about 1.21 to 1.24. However, the current dielectric materials have the lowest refractive index of about 1.35 and cannot meet the requirements on the ideal mono-layer anti-reflection thin film. It is well-known that porous materials have a relatively low refractive index, and in recent years there appeared a variety of research methods for the preparation of a porous anti-reflection thin film, such as etching, sol-gel, vapor deposition, microphase separation, and particle impregnation film forming, etc. However, the preparation processes of these methods are relatively complicated, time-consuming and costly, and the pores in the porous anti-reflection thin film as prepared mostly have an open-celled structure, the mechanical performance and scrub resistance of the thin film need to be further improved.

A miniemulsion is a kind of dynamically stable liquid-liquid dispersion system, the dispersed droplets have a size that can be adjusted between 30 and 500 nm, and the monomer droplets in the miniemulsion polymerization can be directly converted into emulsion particles, i.e. a monomer droplet nucleation mechanism. Accordingly, the monomer droplets in the miniemulsion system can be regarded as nano-reactors independent from each other, which are very suitable for preparing nanoparticles with various structures. The core of reversible addition-fragmentation chain transfer living radical polymerization (RAFT living polymerization for short) lies in introducing a chain transfer agent called a reversible addition-fragmentation chain transfer agent into the radical polymerization system, which usually is dithioester or trithiocarbonate, wherein the radical can be subjected to an efficient reversible chain transfer reaction with the reversible addition-fragmentation chain transfer agent such that the polymer chain has active features. The present invention introduces an amphiphilic macromolecule reversible addition-fragmentation chain transfer agent into the miniemulsion system in combination with the monomer droplet nucleation mechanism of the miniemulsion polymerization and the features of the reversible addition-fragmentation chain transfer living radical polymerization. Since the amphiphilic macromolecule reversible addition-fragmentation chain transfer agent has an amphiphilic structure, it not only can be auto-assembled at the monomer droplet interface, but also plays the role of the reversible addition-fragmentation chain transfer agent to achieve the reversible addition-fragmentation chain transfer living radical polymerization, such that the monomer and a crosslinking agent can be crosslinked and polymerized at the monomer droplet interface to form highly crosslinked polymeric shells, the core material undergoes a phase separation from the polymer and is located at the center of the particles to form polymer nanocapsules with a complete structure. When the shell of the polymeric nanocapsules consists of highly crosslinked polymers, hollow polymeric nanoparticles with a high strength can be obtained after the core material thereof has been removed, which can maintain a relatively regular spherical structure while do not suffer from deformation and collapse.

When the cavity volume of a hollow polymeric nanoparticle has a diameter of less than 100 nm, a thin film composed of the hollow polymeric nanoparticles is transparent, and the cavity volumes of the hollow nanoparticles can effectively decrease the refractive index of the thin film, thereby forming a porous thin film with a low refractive index. The present invention prepares highly crosslinked polymeric nanocapsules having a diameter in the range of from about 80 to 120 nm in the miniemulsion system by means of the reversible addition-fragmentation chain transfer living radical polymerization, forms a thin film by spin coating an aqueous dispersion of polymeric nanocapsules on the surface of a substrate, and then obtains a transparent porous anti-reflection thin film composed of hollow polymeric nanoparticles after removing the core material of the polymeric nanocapsules by drying in a vacuum at a high temperature. The present invention requires simple preparation processes and can effectively adjust the thickness and refractive index of the anti-reflection thin film by changing the concentration of the aqueous dispersion of polymeric nanocapsules and the cavity volume fractions of the hollow polymeric nanoparticles so as to meet different anti-reflection requirements. In addition, when the mass percentage concentration of the aqueous dispersion of polymeric nanocapsules is not less than 5%, most of the pore structures in the porous anti-reflection thin film formed by hollow polymeric nanoparticles being densely aligned are closed cell structures consisting of cavity portions of the hollow polymeric nanoparticles, and the backbone thereof consists of highly crosslinked polymers. Consequently, the formed porous anti-reflection thin film has a relatively high mechanical strength and friction resistant property, which can effectively overcome the problem of a poor mechanical performance existing in the current porous anti-reflection thin film.

SUMMARY OF THE INVENTION

The objective of the present invention is to provide a method for preparing a porous anti-reflection thin film composed of hollow polymeric nanoparticles with regard to the problems of a complicated preparation process and poor mechanical performance existing in the current porous anti-reflection thin film.

The objective of the present invention is achieved by the following technical solution: a method for preparing a porous anti-reflection thin film composed of hollow polymeric nanoparticles comprising steps as follows.

(1) polymeric nanocapsules are formulated into an aqueous dispersion at a mass percentage concentration of 3-7%, which is spin-coated by a spin coater at one side or both sides on the surface of a substrate to form a thin film containing polymeric nanocapsules after water has been volatilized;

(2) the thin film containing polymeric nanocapsules is disposed in a vacuum oven and dried at a temperature of 150-180° C. for 4-5 hours, wherein the polymeric nanocapsules turn to be hollow polymeric nanoparticles after water in the thin film and the core material in the polymeric nanocapsules have been completely volatilized, thereby obtaining a porous anti-reflection thin film composed of hollow polymeric nanoparticles. The porous anti-reflection thin film has a thickness in the range of 74-127 nm, a refractive index in the range of 1.15-1.26, and a porosity in the range of 0.47-0.66.

The substrate is a transparent quartz plate or glass plate.

A method for preparing the polymeric nanocapsules comprises steps as follows:

1) 0.1-0.3 parts by weight of 4,4'-Azobis(4-cyanovaleric acid) and 1-2 parts by weight of dodecyl-3-nitrile group valerate trithioester are dissolved into 30-50 parts by weight of a dioxane solvent, which is further added and uniformly mixed with 3-7 parts by weight of hydrophilic monomers and 4-6 parts by weight of hydrophobic monomers, and subjected to polymerization at a temperature of 70-90° C. for 6-9 hours to yield an amphiphilic macromolecule reversible addition-fragmentation chain transfer agent, wherein the hydrophilic monomers are acrylic acid or methacrylic acid, and the hydrophobic monomers are styrene or methyl methacrylate;

2) 0.5-1 parts by weight of the amphiphilic macromolecule reversible addition-fragmentation chain transfer agent and 70-80 parts by weight of deionized water are formulated into aqueous solution as an aqueous phase, which is added and uniformly mixed with an oil phase consisting of 2-8 parts by weight of a vinyl monomer, 8-10 parts by weight of a crosslinking agent, 0.05-0.1 parts by weight of an oil soluble initiator and 4-10 parts by weight of liquid linear chain alkane, and prepared by an ultrasonic crasher into a miniemulsion under the effect of a high shear field;

3) the miniemulsion is subjected to reversible addition-fragmentation chain transfer living radical miniemulsion polymerization at a temperature of 60-80° C. for 4-6 hours, which is cooled and discharged to yield polymeric nanocapsules with highly crosslinked shells, wherein the core portion of the polymeric nanocapsules is the liquid linear chain alkane, and the shell thereof is a highly crosslinked polymer formed by polymerization of the vinyl monomer and the crosslinking agent.

The polymeric nanocapsules have an average diameter of 90-120 nm. Hollow polymeric nanoparticles are yielded after the core material of the polymeric nanocapsules has been removed by drying in a vacuum at a high temperature, and the hollow polymeric nanoparticles have a cavity volume fraction of 0.27-0.58.

The vinyl monomer is methyl methacrylate, styrene, methacrylic acid, butyl methacrylate, n-butyl acrylate or hydroxypropyl acrylate. The crosslinking agent is p-divinyl benzene or ethylene glycol dimethacrylate. The oil soluble initiator is azobisisobutyronitrile. The liquid linear chain alkane is n-heptane, n-octane, n-hexadecane or olefin.

The present invention possesses the following beneficial effects over the prior art.

1. During the preparation of the porous anti-reflection thin film composed of hollow polymeric nanoparticles by using polymeric nanocapsules, it is convenient to adjust the pore size and porosity of the porous anti-reflection thin film by changing the cavity volume size and fraction of the hollow polymeric nanoparticles.

2. The porous anti-reflection thin film is prepared by means of spin coating, thus the thickness of the thin film can be precisely regulated by changing the concentration of the aqueous dispersion of the polymeric nanocapsules, which is easy to control and uniform.

3. Most of the pore structures in the porous anti-reflection thin film composed of hollow polymeric nanoparticles are closed cell structures composed of cavity portions of the hollow nanoparticles, and the backbone of the thin film is composed of highly crosslinked polymers, so the prepared porous anti-reflection thin film has a better mechanical strength and friction-resistant property.

4. The preparation processes are simple and the cost is low.

SPECIFIC EMBODIMENTS

Figure 1:
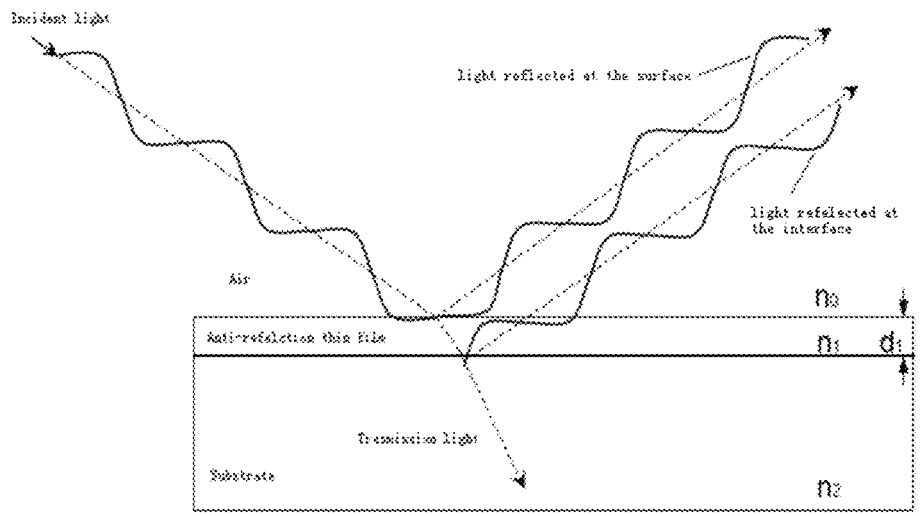
FIG. 1 is a mechanism map of an anti-reflection thin film of the present invention: $n_0$, $n_1$ and $n_2$ are refractive indexes of air, the anti-reflection thin film and a substrate, respectively; $d_1$ is the thickness of the anti-reflection thin film.

The method for preparing a porous anti-reflection thin film composed of hollow polymeric nanoparticles comprising steps as follows:

1) polymeric nanocapsules are formulated into an aqueous dispersion at a mass percentage concentration of 3-7%, which is spin-coated by a spin coater at one side or both sides on the surface of a substrate to form a thin film containing polymeric nanocapsules after water has been volatilized;

2) the thin film containing polymeric nanocapsules is disposed in a vacuum oven and dried at a temperature of 150-180° C. for 4-5 hours, wherein the polymeric nanocapsules turn to be hollow polymeric nanoparticles after water in the thin film and the core material in the polymeric nanocapsules have been completely volatilized, thereby obtaining a porous anti-reflection thin film composed of hollow polymeric nanoparticles. The porous anti-reflection thin film has a thickness in the range of 74-127 nm, a refractive index in the range of 1.15-1.26, and a porosity in the range of 0.47-0.66.

The substrate is a transparent quartz plate or glass plate.

A method for preparing the polymeric nanocapsules comprises steps as follows:

1. 0.1-0.3 parts by weight of 4,4'-Azobis(4-cyanovaleric acid) and 1-2 parts by weight of dodecyl-3-nitrile group valerate trithioester are dissolved into 30-50 parts by weight of a dioxane solvent, which is further added and uniformly mixed with 3-7 parts by weight of a hydrophilic monomer and 4-6 parts by weight of a hydrophobic monomer, and subjected to polymerization at a temperature of 70-90° C. for 6-9 hours to yield an amphiphilic macromolecule reversible addition-fragmentation chain transfer agent, wherein the hydrophilic monomer is acrylic acid or methacrylic acid, and the hydrophobic monomer is styrene or methyl methacrylate;

2. 0.5-1 parts by weight of the amphiphilic macromolecule reversible addition-fragmentation chain transfer agent and 70-80 parts by weight of deionized water are formulated into an aqueous solution as an aqueous phase, which is added and uniformly mixed with an oil phase consisting of 2-8 parts by weight of a vinyl monomer, 8-10 parts by weight of a crosslinking agent, 0.05-0.1 parts by weight of an oil soluble initiator and 4-10 parts by weight of liquid linear chain alkane, and prepared by an ultrasonic crasher into a miniemulsion under the effect of a high shear field;

3. the miniemulsion is subjected to reversible addition-fragmentation chain transfer living radical miniemulsion polymerization at a temperature of 60-80° C. for 4-6 hours, which is cooled and discharged to yield polymeric nanocapsules with highly crosslinked shells, wherein the core portion of the polymeric nanocapsules is the liquid linear chain alkane, and the shell thereof is a highly crosslinked polymer formed by polymerization of the vinyl monomer and the crosslinking agent.

The polymeric nanocapsules have an average diameter of 90-120 nm. Hollow polymeric nanoparticles are yielded after the core material of the polymeric nanocapsules has been removed by drying in a vacuum at a high temperature, and the hollow polymeric nanoparticles have a cavity volume fraction of 0.27-0.58.

The vinyl monomer is methyl methacrylate, styrene, methacrylic acid, butyl methacrylate, n-butyl acrylate or hydroxypropyl acrylate. The crosslinking agent is p-divinyl benzene or ethylene glycol dimethacrylate. The oil soluble initiator is azobisisobutyronitrile. The liquid linear chain alkane is n-heptane, n-octane, n-hexadecane or olefin.

The following contents will further describe the present invention in combination with specific examples, but the protection scope of the present invention is not limited to this.

EXAMPLE 1

I. Preparation of Polymeric Nanocapsules 1. 7 g of methacrylic acid, 6 g of methyl methacrylate, 0.3 g of 4,4'-Azobis(4-cyanovaleric acid), and 2 g of dodecyl-3-nitrile group valerate trithioester were dissolved into 50 g of a dioxane solvent, and were subjected to polymerization at a temperature of 70° C. for 9 hours to yield an amphiphilic macromolecule reversible addition-fragmentation chain transfer agent. The structural formula is as follows:

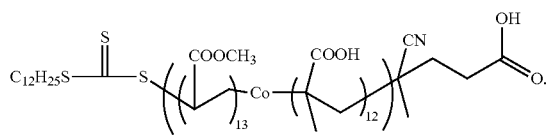

2. 0.5 g of the amphiphilic macromolecule reversible addition-fragmentation chain transfer agent and 70 g of deionized water were formulated into an aqueous solution as an aqueous phase, which was added and uniformly mixed with an oil phase consisting of 6 g of methyl methacrylate, 8 g of p-vinyl benzene, 0.05 g of azobisisobutyronitrile and 7 g of olefin, and prepared by an ultrasonic crasher into a miniemulsion under the effect of a high shear field.

3. The miniemulsion was transferred to a reactor and subjected to the reaction at a temperature of 60° C. which stopped after 6 hours, and was cooled and discharged to yield polymeric nanocapsules having an average diameter of 105 nm, wherein the core material of the polymeric nanocapsules was olefin, the shell thereof was a polymer formed by crosslinking methyl methacrylate with p-vinyl benzene, and the core/shell ratio was 1:2, which core/shell ratio refers to a mass ratio of the mass of the core material to the total amount of the monomer and crosslinking agent forming the shell material.

II. Preparation of Hollow Polymeric Nanoparticles

Figure 2:
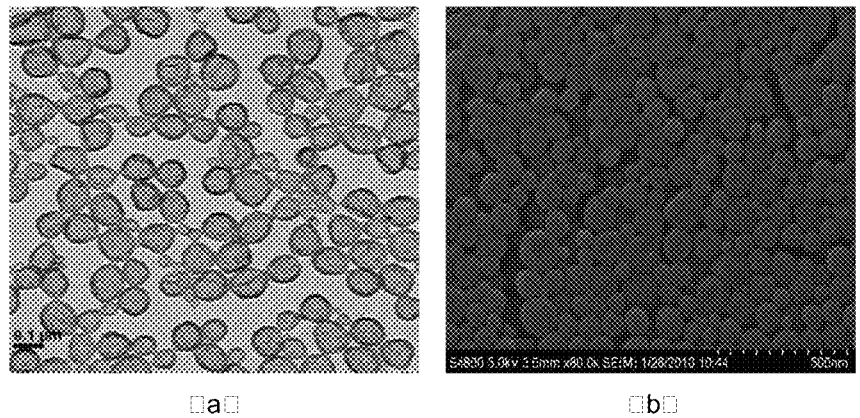
FIG. 2(a) is a transmission electron microscope of the hollow polymeric nanoparticles as prepared in Example 1 of the present invention.
FIG. 2(b) is a scanning electron microscope image of the hollow polymeric nanoparticles as prepared in Example 1 of the present invention.

The resultant polymeric nanocapsules were put into a vacuum oven and dried at a temperature of 180° C. for 5 hours to remove the core material thereof and unreacted residual monomers, thereby yielding hollow polymeric nanoparticles. The morphology of the resultant hollow polymeric nanoparticles as well as deformation and collapse thereof was observed via the transmission electron microscope and scanning electron microscope, and the results therefor are shown in FIG. 2. As can be seen from FIG. 2a, the prepared hollow polymeric nanoparticles have clear core/shell structures, and most of them are regular spherical structures. According to the statistical result of the particle diameters in the transmission electron microscope image, the prepared polymeric nanocapsules and hollow polymeric nanoparticles have an average diameter of 102 nm and a cavity volume fraction of 0.43. It is found from FIG. 2b that most of the hollow polymeric particles maintain a good spherical structure, and slight deformation only occurs to a few particles with large particle sizes, thus these highly crosslinked hollow polymeric nanoparticles would not suffer from deformation and collapse but keep their original cavity volume fractions during the film-forming process.

III. Preparation of the Porous Anti-Reflection Thin Film Composed of Hollow Polymeric Nanoparticles and Detection of the Performance Thereof 1. The prepared solution of polymeric nanocapsules was diluted into an aqueous dispersion at a mass percentage concentration of 6%, the aqueous dispersion containing nanocapsules was spin-coated by a spin coater at one side or both sides on the surface of a quartz plate to form a thin film, wherein the rotational speed of a first phase of the spin coating was controlled at 500 revolutions/minute, the time therefor was 15 seconds, and the rotational speed of a second phase of the spin coating was controlled at 2000 revolutions/minute, the time therefor was 60 seconds.

2. The thin film as obtained from the spin-coating was disposed in a vacuum oven and dried at a temperature of 180° C. for 5 hours, the polymeric nanocapsules turned to be hollow polymeric nanoparticles after water in the thin film and the core material in the nanocapsules were completely volatilized, thereby yielding a porous anti-reflection thin film composed of hollow polymeric nanoparticles.

Figure 3:
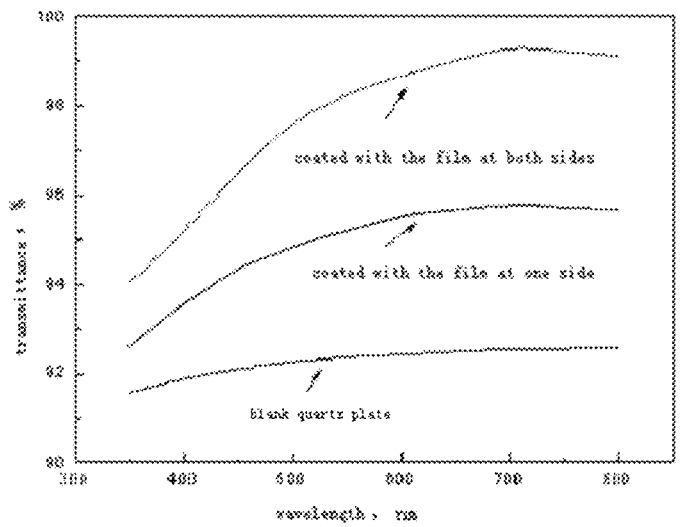
FIG. 3 is a transmittance graph of the porous anti-reflection thin film as prepared in Example 1 of the present invention.
Figure 4:
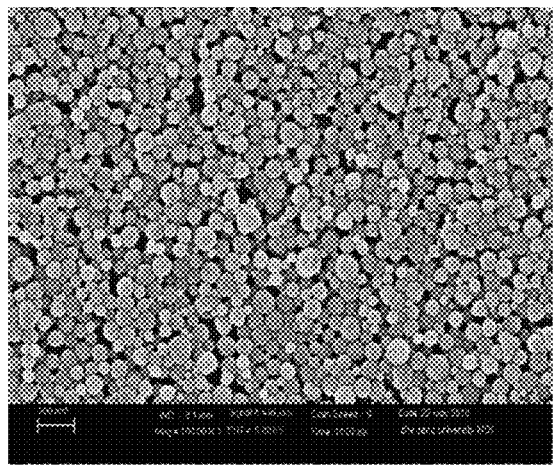
FIG. 4 is a scanning electron microscope image of the porous anti-reflection thin film as prepared in Example 1 of the present invention after being amplified by one hundred thousand times.

3. Upon testing by an ellipsometer, a Cauchy model was used to simulate the thickness, refractive index and porosity of the prepared porous anti-reflection thin film, and the obtained specific property parameters are as shown in Table 1. The optical properties of the quartz plate after being coated with the anti-reflection thin film at its one side and both sides within the scope of visible light are as shown in FIG. 3, wherein the transmittances of the quartz plate after being coated with the film at its one side and both sides increase from 92.53% for a blank quartz plate to 95.89% and 99.36%, respectively at the optimum wavelength of 700 nm. As for a quartz plate coated with the film at both of its sides, the transmittances thereof within the scope of all visible light all have notably increased, and particularly, the transmittances all exceed 98% within the scope of the wavelengths of 550-800 nm. FIG. 4 is a scanning electron microscope image of the porous anti-reflection thin film as prepared in Example 1, from which it can be found that the hollow polymeric nanoparticles are densely aligned to form an uniform and compact thin film. Although the thin film still includes a few gap portions with small sizes, these gaps have a size in the range of 10 to 30 nm which is much smaller than the wavelength of visible light, and thus the resultant porous anti-reflection thin film is completely transparent. In addition, the pore structures in the prepared porous anti-reflection thin film mostly consist of cavity portions of the hollow nanoparticles, these pores are packaged by highly crosslinked shell polymers to form closed cell structures, and thereby the resultant anti-reflection thin film has a better mechanical strength and scrub-resistant property.

EXAMPLES 2-5

Except for the different concentration of the aqueous dispersion of nanocapsules, other operations of Examples 2-5 are all identical with those of Example 1. The aqueous dispersions of nanocapsules as used in Examples 2-5 are at mass percentage concentrations of 3%, 4%, 5% and 7%, respectively, and the specific property parameters of the prepared porous anti-reflection thin films are as shown in Table 2. It can be found from Table 2 that the thickness and refractive index of the prepared anti-reflection thin film both increase with the increase of the concentration of the aqueous dispersion of nanocapsules, because when the concentration of the aqueous dispersion of nanocapsules increases, the formed thin film contains an increased number of nanocapsules which are aligned more densely at the same spin coating speed, thus the thickness of the film increases, and the porosity of the porous thin film decreases after drying in a vacuum, thereby the refractive index of the thin film increases therewith. This indicates that the thickness and the refractive index of the porous anti-reflection thin film can be conveniently adjusted by changing the concentration of the aqueous dispersion of nanocapsules.

Figure 5:
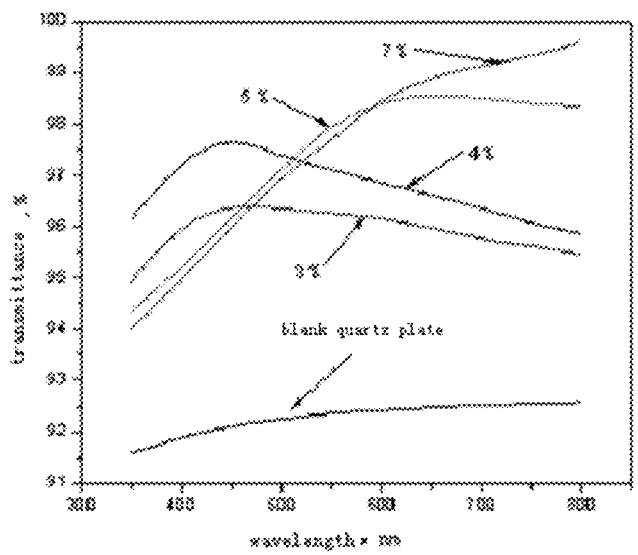
FIG. 5 is a transmittance graph of the porous anti-reflection thin films as prepared in Examples 2-5 of the present invention.
Figure 6:
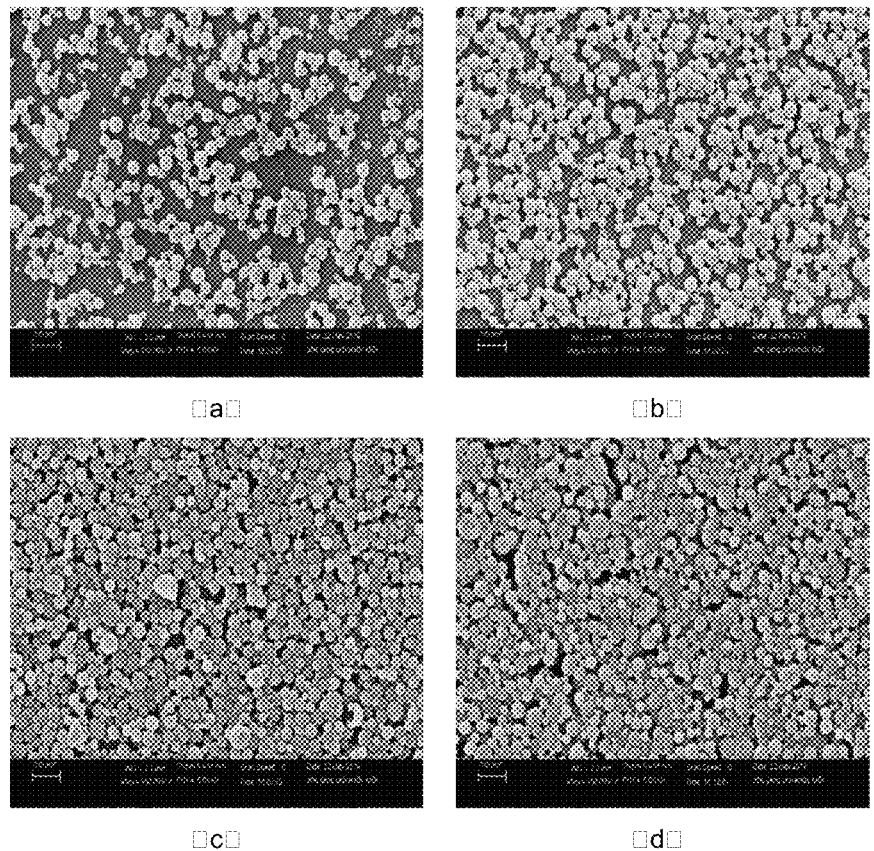
FIG. 6(a) is a scanning electron microscope image of the porous anti-reflection thin film as prepared in Example 2 of the present invention.
FIG. 6(b) is a scanning electron microscope image of the porous anti-reflection thin film as prepared in Example 3 of the present invention.
FIG. 6(c) is a scanning electron microscope image of the porous anti-reflection thin film as prepared in Example 4 of the present invention.
FIG. 6(d) is a scanning electron microscope image of the porous anti-reflection thin film as prepared in Example 5 of the present invention.

In Examples 2-5, the optical properties of the anti-reflection thin film obtained by coating the aqueous dispersion of nanocapsules at different concentrations at both sides on the surface of the quartz plate are as shown in FIG. 5. It can be found that the optimum transmittance of the prepared anti-reflection thin film increases from 96.5% to 99.5% with the increase of the mass percentage concentration of the aqueous dispersion of nanocapsules from 3% to 7%, and the optimum wavelength also transfers from 450 nm to 800 nm, because when the mass percentage concentration of the aqueous dispersion of nanocapsules is 3%, the number of hollow polymeric nanoparticles contained in the formed porous thin film is relatively small, the refractive index is already below 1.21, the gap between particles in the thin film is relative large due to the small number of particles, thus part of light would be scattered and the transmittance of the thin film is thereby influenced (as shown in the scanning electron microscope image in FIG. 6). When the mass percentage concentration of the aqueous dispersion of nanocapsules is between 4 and 7%, the prepared anti-reflection thin films all have relatively high transmittances at the optimum wavelength, as a result, the aqueous dispersion of nanocapsules at different concentrations can be selected according to the requirements of different substrates and wavelength ranges during the actual application to prepare porous anti-reflection thin films having different thicknesses and refractive indexes so as to meet different anti-reflection requirements.

TABLE 1

Specific property parameters of the porous anti-reflection thin film as prepared in Example 1

| Sample | Diameter of hollow nanoparticles (nm) | Cavity volume fraction of hollow nanoparticles | Thickness of anti-reflection thin film (nm) | Refractive index of anti-reflection thin film ($n_1$) | Porosity of anti-reflection thin film (model estimation value) |
|---|---|---|---|---|---|
| Example 1 | 102 | 0.43 | 110 | 1.2276 | 0.51 |

TABLE 2

Specific property parameters of the porous anti-reflection thin films as prepared in Examples 2-5

| Sample | Mass percentage concentration of the aqueous dispersion of nanocapsules (%) | Thickness of the anti-reflection thin film (nm) | Refractive index of the anti-reflection thin film ($n_1$) | Porosity of the thin film (model estimation value) | Optimum wavelength for the anti-reflection thin film (nm) | Transmittance of the anti-reflection thin film at the optimum wavelength (%) |
|---|---|---|---|---|---|---|
| Example 2 | 3 | 74 | 1.1993 | 0.60 | 450 | 96.5 |
| Example 3 | 4 | 83 | 1.2086 | 0.58 | 465 | 97.8 |
| Example 4 | 5 | 96 | 1.2178 | 0.56 | 630 | 98.6 |
| Example 5 | 7 | 127 | 1.2389 | 0.50 | 780 | 99.5 |

EXAMPLE 6

Figure 7:
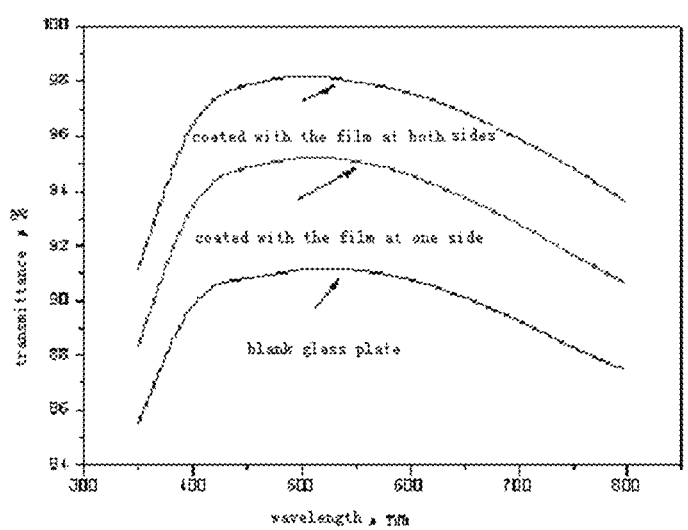
FIG. 7 is a transmittance graph of the porous anti-reflection thin film as prepared in Example 6 of the present invention.

Except for the different substrate, other operations of Example 6 are all identical with those of Example 1. Upon preparing the porous anti-reflection thin film containing hollow polymeric nanoparticles, Example 6 selected a transparent glass plate as the substrate, diluted the prepared solution of polymeric nanocapsules into an aqueous dispersion at a mass percentage concentration of 5%, and spin-coated the aqueous dispersion containing nanocapsules with a spin coater at one side and both sides on the surface of the glass plate to form a thin film. The resultant thin film obtained from the spin coating was disposed in a vacuum oven and dried at a temperature of 180° C. for 5 hours, the polymeric nanocapsules turned to be hollow polymeric nanoparticles after water in the thin film and the core material in the nanocapsules were completely volatilized, thereby yielding a porous anti-reflection thin film composed of hollow polymeric nanoparticles. The optical properties of the porous anti-reflection thin film as prepared on the glass plate in Example 6 are as shown in FIG. 7. It can be found from FIG. 7 that the transmittances of the glass plate after being coated with the film at its one side and both sides increase from 91.21% for a blank glass plate to 95.34% and 98.35%, respectively at the optimum wavelength of 500 nm. For a glass plate coated with the film at both of its sides, the transmittances thereof within the scope of all visible light all have notably increased, and particularly, the increments of the transmittances all exceed 6.5% within the scope of the wavelengths of 400-750 nm.

EXAMPLE 7

0.5 g of the amphiphilic macromolecule reversible addition-fragmentation chain transfer agent as prepared in Example 1 and 80 g of deionized water were formulated into an aqueous solution as an aqueous phase, which was added and uniformly mixed with an oil phase consisting of 7 g of methyl methacrylate, 9 g of p-vinyl benzene, 0.05 g of azobisisobutyronitrile and 4 g of olefin, and prepared by an ultrasonic crasher into a miniemulsion under the effect of a high shear field. The miniemulsion was transferred into a reactor and subjected to the reaction at a temperature of 70° C. which stopped after 6 hours, and then cooled to the room temperature and discharged to yield polymeric nanocapsules with highly crosslinked shells having a core/shell ratio of 1:4.

EXAMPLE 8

0.5 g of the amphiphilic macromolecule reversible addition-fragmentation chain transfer agent as prepared in Example 1 and 80 g of deionized water were formulated into an aqueous solution as an aqueous phase, which was added and uniformly mixed with an oil phase consisting of 5 g of methyl methacrylate, 10 g of p-vinyl benzene, 0.05 g of azobisisobutyronitrile and 5 g of olefin, and prepared by an ultrasonic crasher into a miniemulsion under the effect of a high shear field. The miniemulsion was transferred into a reactor and subjected to the reaction at a temperature of 70° C. which stopped after 6 hours, and then cooled to the room temperature and discharged to yield polymeric nanocapsules with highly crosslinked shells having a core/shell ratio of 1:3.

EXAMPLE 9

0.5 g of the amphiphilic macromolecule reversible addition-fragmentation chain transfer agent as prepared in Example 1 and 80 g of deionized water were formulated into an aqueous solution as an aqueous phase, which was added and uniformly mixed with an oil phase consisting of 2 g of methyl methacrylate, 8 g of p-vinyl benzene, 0.05 g of azobisisobutyronitrile and 10 g of olefin, and prepared by an ultrasonic crasher into a miniemulsion under the effect of a high shear field. The miniemulsion was transferred into a reactor and subjected to the reaction at a temperature of 70° C. which stopped after 6 hours, and then cooled to the room temperature and discharged to yield polymeric nanocapsules with highly crosslinked shells having a core/shell ratio of 1:1.

EXAMPLE 10

(1) Preparation of hollow polymeric nanoparticles having cavity volume fractions of 0.27, 0.35 and 0.58, respectively The polymeric nanocapsules with highly crosslinked shells having different core/shell ratios as prepared in Examples 7-9 were put into a vacuum oven and dried at a temperature of 180° C. for 5 hours to remove the core materials thereof and unreacted residual monomers, thereby obtaining hollow polymeric nanoparticles having different cavity volume fractions. As known from the statistical result of the transmission electron microscope, hollow nanoparticles having cavity volume fractions of 0.27, 0.35 and 0.58, respectively are obtained from the nanocapsules having the core/shell ratios of 1:4, 1:3 and 1:1 upon drying, and corresponding average diameters of the hollow nanoparticles are 96 nm, 100 nm and 108 nm, respectively.

(2) Preparation of a porous anti-reflection thin film composed of hollow polymeric nanoparticles The polymeric nanocapsules having the core/shell ratios of 1:4, 1:3 and 1:1, respectively, in Examples 7-9 were diluted into an aqueous dispersion at a mass percentage concentration of 5%, the aqueous dispersion containing nanocapsules was spin-coated by a spin coater at one side on the surface of a quartz plate to form a thin film, wherein the rotational speed of a first phase of the spin coating was controlled at 500 revolutions/minute, the time therefor was 15 seconds, and the rotational speed of a second phase of the spin coating was controlled at 2000 revolutions/minute, the time therefor was 60 seconds. The thin film as obtained from the spin-coating was disposed in a vacuum oven and dried at a temperature of 180° C. for 5 hours, the polymeric nanocapsules turned to be hollow nanoparticles after water in the thin film and the core material in the nanocapsules were completely volatilized, thereby obtaining a porous anti-reflection thin film composed of hollow nanoparticles having cavity volume fractions of 0.27, 0.35 and 0.58, respectively.

The resultant porous anti-reflection thin film was subjected to the testing by an ellipsometer, and a Cauchy model was used to simulate the thickness, refractive index and porosity thereof. The specific property parameters are as shown in Table 3. As can be seen from Table 3, the porous anti-reflection thin film having a thickness in the range of 95-101 nm can be obtained under the condition that the mass percentage concentration of the aqueous dispersion of nanocapsules is 5%; hollow polymeric nanoparticles having different cavity volume fractions can be prepared by changing the core/shell ratio of the nanocapsules, the refractive index of the porous anti-reflection thin film composed of the hollow polymeric nanoparticles can thus be regulated; when the core/shell ratio of the nanocapsules increases from 1:4 to 1:1, the refractive index of the anti-reflection thin film decreases from 1.26 to 1.15, and the porosity thereof also increases from 0.47 to 0.66, and this indicates that the refractive index of the anti-reflection thin film can be regulated by changing the core/shell ratio of the nanocapsules on the premise that the densely porous thin film can be formed in the case of keeping the mass percentage concentration of the aqueous dispersion of polymeric nanocapsules not less than 5%, thus nanocapsules having different core/shell ratios can be selected according to the refractive indexes of different substrates as used so as to prepare anti-reflection thin films with different refractive indexes, thereby obtaining the most suitable refractive index satisfying different substrates so as to achieve a better anti-reflection effect.

phase, which was added and uniformly mixed with an oil phase consisting of 6 g of styrene, 12 g of p-vinyl benzene, 0.1 g of azobisisobutyronitrile and 9 g of n-octane, and prepared by an ultrasonic crasher into a miniemulsion under the effect of a high shear field. The miniemulsion was transferred to a reactor and subjected to the reaction at a temperature of 80° C. which stopped after 4 hours, and then cooled to the room temperature and discharged to yield polymeric nanocapsules with highly crosslinked shells which were formed by the polymerization of styrene and p-divinyl benzene, wherein the polymeric nanocapsules have an average diameter of 90 nm.

3. The prepared solution of polymeric nanocapsules was diluted into an aqueous dispersion at a mass percentage concentration of 6%, and the aqueous dispersion containing nanocapsules was spin-coated by a spin coater at both sides on the surface of the quartz plate to form a thin film, wherein the rotational speed of a first phase of the spin coating was controlled at 500 revolutions/minute, the time therefor was 15 seconds, and the rotational speed of a second phase of the spin coating was controlled at 2000 revolutions/minute, the time therefor was 60 seconds. The thin film as obtained from the spin-coating was disposed in a vacuum oven and dried at a temperature of 150° C. for 4 hours, the polymeric nanocapsules turned to be hollow polymeric nanoparticles after water in the thin film and the core material in the nanocapsules were completely volatilized, thereby obtaining a porous anti-reflection thin film composed of hollow polymeric nanoparticles, wherein the highly crosslinked polymers formed by the polymerization of styrene and p-divinyl benzene are the backbone of the porous anti-reflection thin film.

TABLE 3

Specific property parameters of the porous anti-reflection thin film as prepared in Example 10

| Source of nanocapsules | Core/shell ratio of nanocapsules | Cavity volume fraction of hollow nanoparticles | Refractive index of anti-reflection thin film ($n_1$) | Thickness of anti-reflection thin film (nm) | Porosity of thin film (model estimation value) |
|---|---|---|---|---|---|
| Example 7 | 1:4 | 0.27 | 1.26 | 99 | 0.47 |
| Example 8 | 1:3 | 0.35 | 1.23 | 101 | 0.53 |
| Example 9 | 1:1 | 0.58 | 1.15 | 95 | 0.66 |

EXAMPLE 11

I. Preparation of Polymeric Nanocapsules 1. 3 g of methacrylic acid, 4 g of styrene, 0.1 g of 4,4'-Azobis(4-cyanovaleric acid), and 1 g of dodecyl-3-nitrile group valerate trithioester were dissolved into 30 g of a dioxane solvent, which were subjected to polymerization at a temperature of 90° C. for 6 hours to yield an amphiphilic macromolecule reversible addition-fragmentation chain transfer agent. The structural formula is as follows:

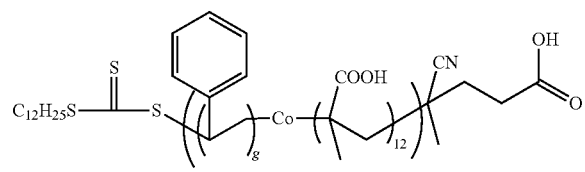

2. 1 g of the amphiphilic macromolecule reversible addition-fragmentation chain transfer agent and 80 g of deionized water were formulated into an aqueous solution as an aqueous

EXAMPLE 12

1. 0.6 g of the amphiphilic macromolecule reversible addition-fragmentation chain transfer agent as prepared in Example 11 and 70 g of deionized water were formulated into an aqueous solution as an aqueous phase, which was added and uniformly mixed with an oil phase consisting of 4 g of styrene, 6 g of ethyleneglycol dimethacrylate, 0.05 g of azobisisobutyronitrile and 10 g of n-hexadecane, and prepared by an ultrasonic crasher into a miniemulsion under the effect of a high shear field. The miniemulsion was transferred into a reactor and subjected to the reaction at a temperature of 80° C. which stopped after 4 hours, and then cooled to the room temperature and discharged to yield polymeric nanocapsules with highly crosslinked shells which were formed by the polymerization of styrene and ethyleneglycol dimethacrylate, wherein the polymeric nanocapsules have an average diameter of 120 nm.

2. The prepared solution of polymeric nanocapsules was diluted into an aqueous dispersion at a mass percentage concentration of 6%, and the aqueous dispersion containing nanocapsules was spin-coated by a spin coater at both sides on the surface of the quartz plate to form a thin film, wherein the rotational speed of a first phase of the spin coating was controlled at 500 revolutions/minute, the time therefor was 15 seconds, and the rotational speed of a second phase of the spin coating was controlled at 2000 revolutions/minute, the time therefor was 60 seconds. The thin film as obtained from the spin-coating was disposed in a vacuum oven and dried at a temperature of 180° C. for 5 hours, and the polymeric nanocapsules turned to be hollow polymeric nanoparticles after water in the thin film and the core material in the nanocapsules were completely volatilized, thereby obtaining a porous anti-reflection thin film composed of hollow polymeric nanoparticles, wherein the highly crosslinked polymers formed by the polymerization of styrene and ethyleneglycol dimethacrylate are the backbone of the porous anti-reflection thin film.

The above examples are used to explain and set forth but not limit the present invention. Any amendments and modifications made to the present invention within the spirit of the present invention and the protection scopes of the claims fall into the protection scope of the present invention.

The invention claimed is:

1. A method for preparing a porous anti-reflection thin film composed of hollow polymeric nanoparticles, characterized in that it comprises steps as follows:
   (1) polymeric nanocapsules are formulated into an aqueous dispersion at a mass percentage concentration of 3-7%, which is spin-coated by a spin coater at one side or both sides on the surface of a substrate to form a thin film containing polymeric nanocapsules after water has been volatilized;
   (2) said thin film containing polymeric nanocapsules is disposed in a vacuum oven and dried at a temperature of 150-180° C. for 4-5 hours, wherein the polymeric nanocapsules turn to be hollow polymeric nanoparticles after water in the thin film and the core material in the polymeric nanocapsules have been completely volatilized, thereby yielding a porous anti-reflection thin film composed of hollow polymeric nanoparticles; the porous anti-reflection thin film has a thickness in the range of 74-127 nm, a refractive index in the range of 1.15-1.26, and a porosity in the range of 0.47-0.66;
   wherein the substrate is a transparent quartz plate or glass plate;
   said polymeric nanocapsules are prepared by steps as follows:
   (A) 0.1-0.3 parts by weight of 4,4'-Azobis(4-cyanovaleric acid) and 1-2 parts by weight of dodecyl-3-nitrile group valerate trithioester are dissolved into 30-50 parts by weight of a dioxane solvent, which is further added and uniformly mixed with 3-7 parts by weight of a hydrophilic monomer and 4-6 parts of a hydrophobic monomer, and subjected to polymerization at a temperature of 70-90° C. for 6-9 hours to yield an amphiphilic macromolecule reversible addition-fragmentation chain transfer agent, wherein the hydrophilic monomer is acrylic acid or methacrylic acid, and the hydrophobic monomer is styrene or methyl methacrylate;
   (B) 0.5-1 parts by weight of the amphiphilic macromolecule reversible addition-fragmentation chain transfer agent and 70-80 parts by weight of deionized water are formulated into an aqueous solution as an aqueous phase, which is added and uniformly mixed with an oil phase consisting of 2-8 parts by weight of a vinyl monomer, 8-10 parts by weight of a crosslinking agent, 0.05-0.1 parts by weight of an oil soluble initiator and 4-10 parts by weight of liquid linear chain alkane, and prepared by an ultrasonic crasher into a miniemulsion under the effect of a high shear field;
   (C) the miniemulsion is subjected to reversible addition-fragmentation chain transfer living radical miniemulsion polymerization at a temperature of 60-80° C. for 4-6 hours, which is cooled and discharged to yield polymeric nanocapsules with highly crosslinked shells, wherein the core portion of the polymeric nanocapsules is the liquid linear chain alkane, and the shell thereof is a highly crosslinked polymer formed by the polymerization of the vinyl monomer and the crosslinking agent.

2. The method for preparing a porous anti-reflection thin film composed of hollow polymeric nanoparticles according to claim 1, characterized in that said polymeric nanocapsules have an average diameter of 90-120 nm, hollow polymeric nanoparticles are yielded after the core material of the polymeric nanocapsules has been removed by drying in a vacuum at a high temperature, and the hollow polymeric nanoparticles have a cavity volume fraction of 0.27-0.58.

3. The method for preparing a porous anti-reflection thin film composed of hollow polymeric nanoparticles according to claim 1, characterized in that said vinyl monomer is methyl methacrylate, styrene, methacrylic acid, butyl methacrylate, n-butyl acrylate or hydroxypropyl acrylate.

4. The method for preparing a porous anti-reflection thin film composed of hollow polymeric nanoparticles according to claim 1, characterized in that said crosslinking agent is p-divinyl benzene or ethylene glycol dimethacrylate.

5. The method for preparing a porous anti-reflection thin film composed of hollow polymeric nanoparticles according to claim 3, characterized in that said oil soluble initiator is azobisisobutyronitrile.

6. The method for preparing a porous anti-reflection thin film composed of hollow polymeric nanoparticles according to claim 3, characterized in that said liquid linear chain alkane is n-heptane, n-octane, n-hexadecane or olefin.

* * * * *